UNITED STATES PATENT OFFICE.

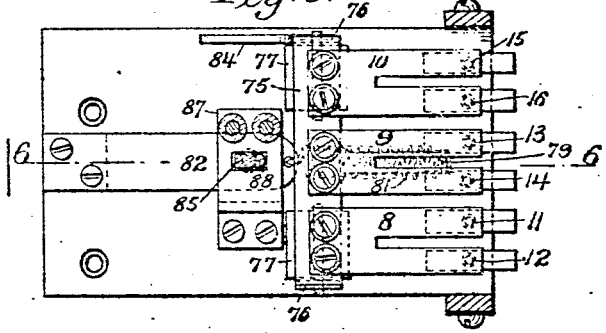
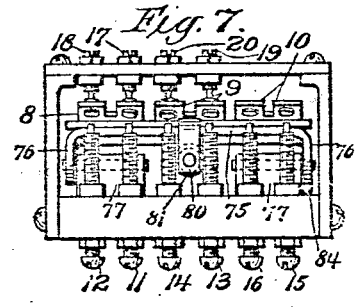
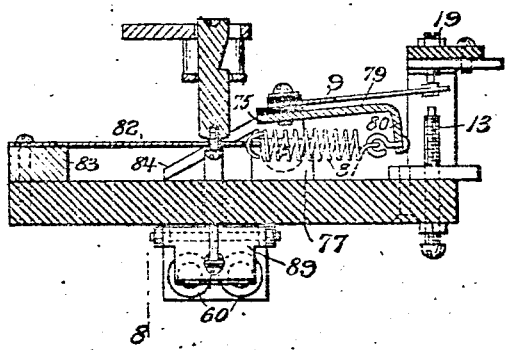
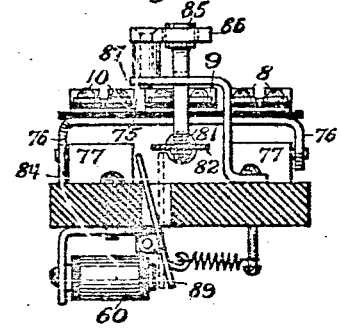
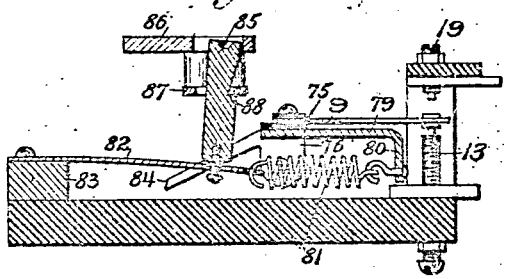
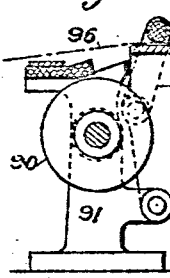
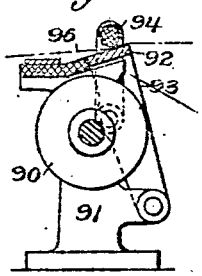

RALPH W. ARMSTRONG, OF NEW YORK, N. Y., ASSIGNOR TO THE GRAY NATIONAL TELAUTOGRAPH COMPANY, OF NEW YORK, N. Y., A CORPORATION OF VIRGINIA.

TELAUTOGRAPH.

978,128.  Specification of Letters Patent.  Patented Dec. 13, 1910.

Application filed November 16, 1906. Serial No. 343,696.

*To all whom it may concern:*

Be it known that I, RALPH W. ARMSTRONG, a citizen of the United States, residing at New York city, county of New York, and State of New York, have invented certain new and useful Improvements in Telautographs, fully described and represented in the following specification and the accompanying drawings, forming a part of the same.

This invention relates to improvements in telautographic apparatus in which the movements of the receiving pen in unison with the transmitting tracer are effected by variations in the strength of the currents sent through the line from the transmitting instrument to the receiving instrument, such variations in current strength being in turn effected by and corresponding to the movements of the transmitting tracer.

The present invention has reference particularly to master switch mechanism controlling the electrical connection of the transmitting and receiving instruments of one station with the receiving and transmitting instruments, respectively, of another station; it being one object of the present invention to provide a master switch mechanism which may be operated by the same hand that is used in writing, instead of by the other hand, as in the case of master switch mechanism heretofore provided.

The advantages of the master switch provided by the present invention are increased ease and speed of operation, and possibility of use of the telautograph by persons who ordinarily have but one hand free, such as telephone operators, in particular. Other advantages are that a transmitter equipped with such a switch may be as readily used by left handed persons as by right handed persons, and is also usable by persons having but one hand.

Figure 1:
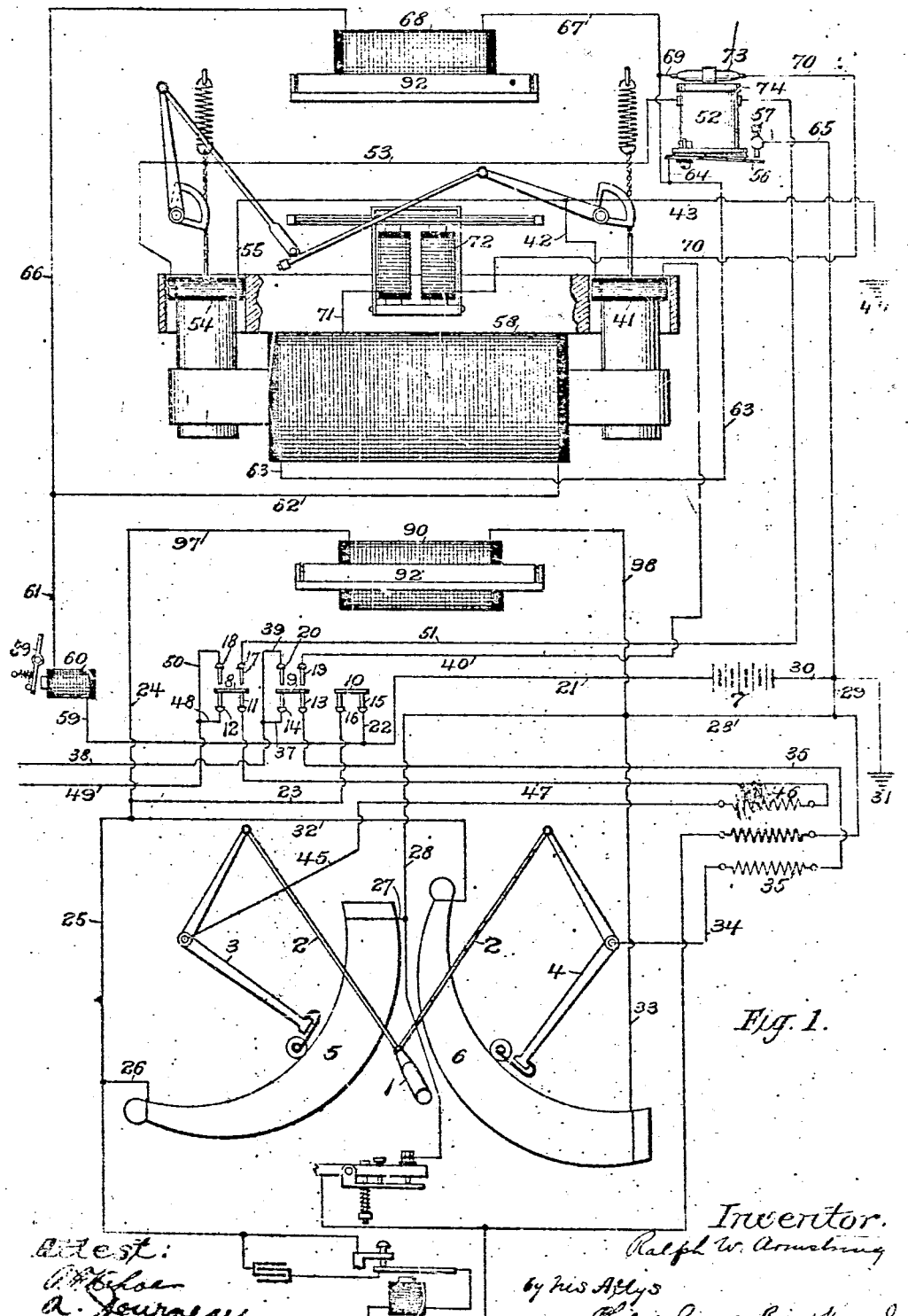
Figure 2:
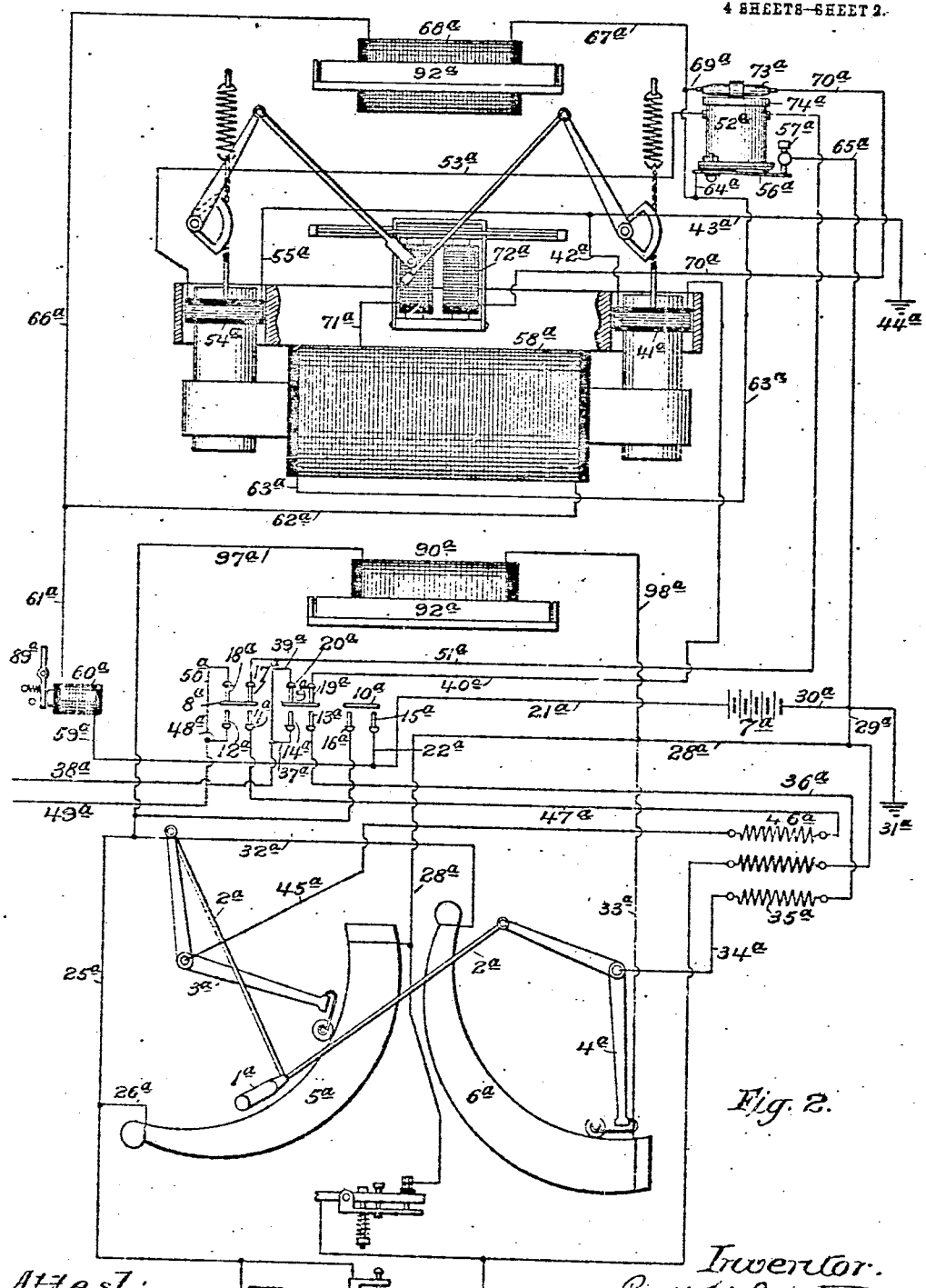
Figure 4:
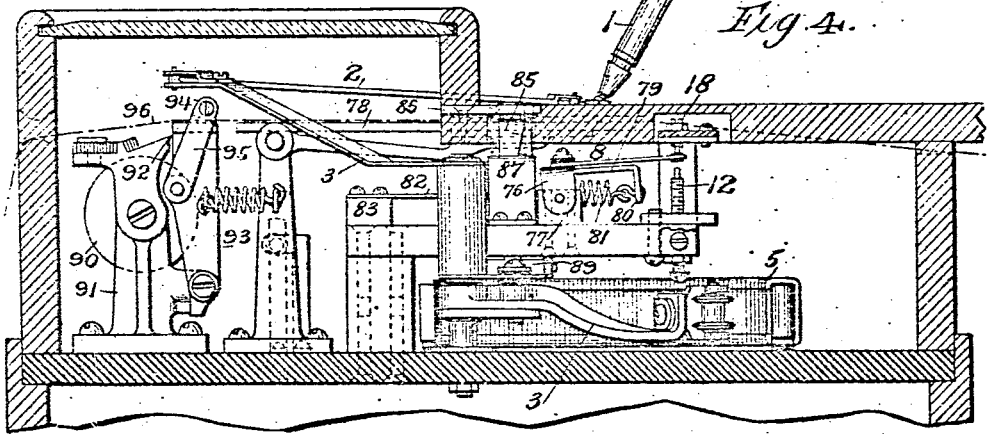
Figure 3:
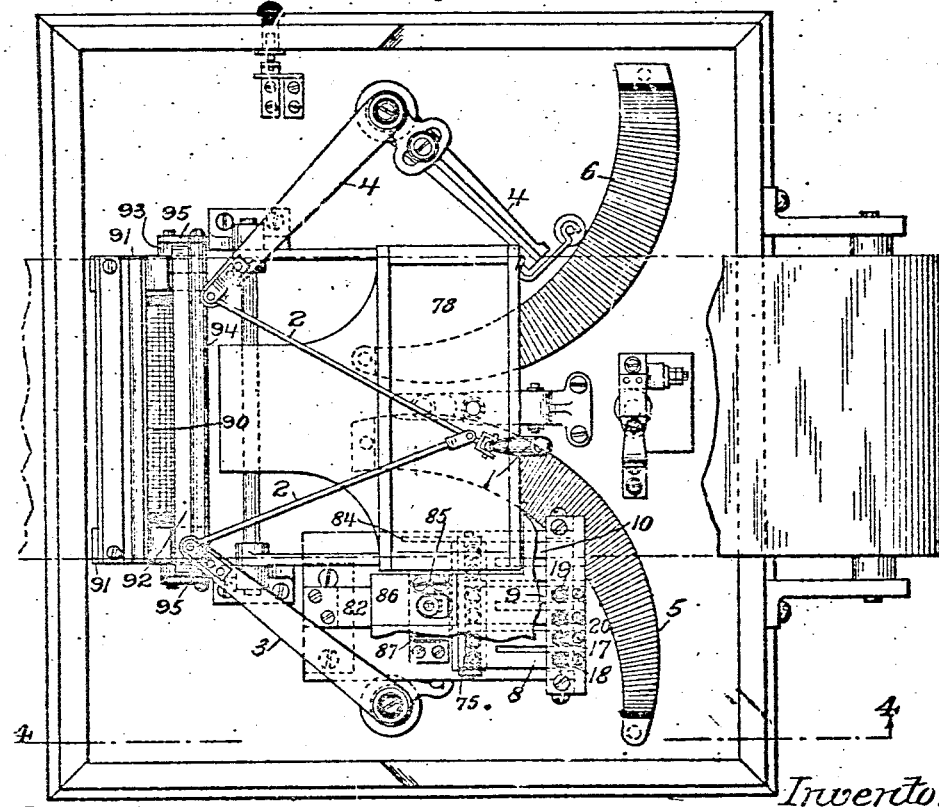

In the accompanying drawings—Figure 1 is a diagrammatic view of a telautographic station provided with a master switch and lock magnet therefor, embodying the present invention; with the tracer of the transmitter shown as transmitting a message to a distant station, and the pen of the receiver as at unison or in normal position. Fig. 2 is a similar view of another station with the pen of the receiver thereof shown as operating to record a message, and the tracer of the transmitter as at unison or in normal position. Fig. 3 is a plan view of the transmitter as it is shown in Fig. 1, i. e., with its tracer out of normal or unison position, and in the act of transmitting a message. Fig. 4 is a vertical section of the same on the line 4—4 of Fig. 3. Fig. 5 is a horizontal section, illustrating the master switch and the lower set of contacts with which it engages when the station is set for transmitting. Fig. 6 is a vertical section through the same on the line 6—6 of Fig. 5. Fig. 7 is an end view of the master switch looking toward the left of Fig. 5. Fig. 8 is a vertical section on the line 8—8 of Fig. 6. Fig. 9 is a view similar to Fig. 6, showing some of the parts in a different position. Fig. 10 is an end view, partly in section, of the paper shifting mechanism at the transmitter, the same being shown in normal position, ready to shift the paper; and Fig. 11 is a similar view, with the parts shown in the positions they occupy on the completion of a shifting operation.

The circuits and devices controlled thereby, illustrated in Figs. 1 and 2, are, as far as they go, and except of course as to the master switch, the paper shifting mechanism at the transmitter, and the lock magnet for the master switch, substantially a reproduction of those illustrated in the application of George S. Tiffany, filed February 5, 1906, Serial Number 299,413, certain of the circuits in which are not reproduced here, because it is unnecessary to do so. So far as the circuits and devices controlled thereby reproduced here are concerned, they need only be described sufficiently to make clear the functions and method of operation of the switch and lock magnet of the present invention, and such brief description will now be given.

For convenience of description, Fig. 1 will be assumed to represent the "home" station, and Fig. 2 a "distant station", and, as the apparatus is identical at the several stations, only one transmitter and one receiver need, therefore, be described. For the purposes of such description, the transmitter of Fig. 1 and the receiver of Fig. 2 will be selected as they are shown as connected in the drawings. In this description, the same reference numerals will be applied to corresponding parts in the two figures, but, for convenience in following the circuits, the reference numerals used in Fig. 2 will be followed by the reference character "a".

The transmitter, Fig. 1, is equipped with the usual tracer 1, pivotally mounted in the converging ends of pencil arms 2, the opposite ends of which are hinged to bell crank levers 3, 4, respectively, journaled in posts rising from the base of the transmitter frame and provided with contact rollers bearing against rheostats 5, 6, respectively, through which currents of varying strength are shunted from a battery 7 into the main line circuits leading to the receiver of a distant station,—Fig. 2, for example. It may be here stated that when the station is transmitting, the battery 7 is the line battery for the main line circuits, but, when the station is receiving, said battery becomes a local battery for certain local circuits in the receiver, and also controls the lock magnet for the master switch, as will presently appear.

The connection of the home station with a distant station for transmitting or receiving, as well as the connection of the rheostats 5, 6, with battery 7, is controlled by the master switch constituting part of the present invention, and, in order that the connections of the two stations may be understood, in advance of a detailed description of such master switch, it may be stated here that this master switch is provided with three spring contact plates 8, 9, 10, suitably insulated from each other and which in their lowermost position, i. e., when the station is transmitting, engage three pairs of stationary contacts 11 and 12, 13 and 14, 15 and 16, respectively (see Fig. 1), while the plates 8, 9, in their uppermost position, i. e., when the station is receiving, engage two pairs of contacts 17 and 18, 19 and 20, respectively, (see Fig. 2) contact plate 10, of course, being then out of engagement with contacts 15, 16.

When the contact plates 8, 9, 10 are in their lowermost positions, the engagement of plate 10 with contacts 15, 16 closes the circuit or circuits from battery 7 through rheostats 5, 6. The circuit thus closed consists, for rheostat 5, of wire 21 from positive pole of battery 7, wire 22, contact 15, plate 10, contact 16 and wires 23, 24, 25, 26, to the smaller end of the rheostat 5, and wires 27, 28, 29, and 30 from the larger end of the rheostat, to the negative pole of battery 7, which is grounded, as shown at 31; while the circuit for rheostat 6, consists of wires 21, 22, contact 15, plate 10, contact 16, wires 23, 24 and 32 to the smaller end of rheostat 6, and wires 33, 28, 29 and 30 from the larger end of the rheostat to the negative pole of the battery. It will be understood that with these circuits thus closed currents will be shunted from battery 7 through rheostats 5, 6, into the main line circuits leading to the receiver of the distant station, and also that such currents will vary in strength according to the positions, lengthwise of rheostats 5, 6, assumed by the contact rollers on bell cranks 3, 4, the movements of which are in turn controlled and effected by tracer 1. With the master switch plates 8, 9, 10 in their lowermost position, also, the engagement of contact plates 8, 9, with stationary contacts 11, 12 and 13, 14, respectively, closes the two (left and right) main line circuits from the transmitter to the distant receiver, thus: The right main line circuit consists (Fig. 1) of the lower arm of bell crank 4, wire 34, one secondary winding, 35, of an induction coil (which has two secondary windings, as shown), wire 36, contact 13, contact plate 9, contact 14, wire 37, wire 38, and (Fig. 2, where the contact plates $8^a$, $9^a$ are then in their uppermost positions, that station being "receiving") wire $38^a$, $39^a$, contact $20^a$, plate $9^a$, contact $19^a$, wire $40^a$, right hand vertically movable coil $41^a$, and wires $42^a$, $43^a$, to ground, as shown, at $44^a$. The left main line circuit consists (Fig. 1) of the lower arm of bell crank lever 3, wire 45, the other secondary winding 46 of the induction coil at the transmitter, wire 47, contact 11, plate 8, contact 12, wires 48, 49, and (Fig. 2) wire $49^a$, $50^a$, contact $18^a$, plate $8^a$, contact $17^a$, wire $51^a$, a relay $52^a$, wire $53^a$, left hand vertically movable coil $54^a$, and wires $55^a$ and $43^a$ to ground, at $44^a$. When the two main line circuits are thus closed, the transmitter of Fig. 1 is "on" and its receiver is "off" with relation to the distant station of Fig. 2; while in Fig. 2 this condition is reversed, the master switch thereof being in its uppermost position with contact plates $8^a$, $9^a$ in engagement with contacts $17^a$, $18^a$ and $19^a$, $20^a$, so that the receiver of Fig. 2 is "on" and the transmitter of that figure is "off" with relation to the station of Fig. 1. The closing of left main line circuit, just described, causes relay $52^a$ to attract its armature $56^a$ and bring it against a contact $57^a$ and thus close certain local circuits at the receiver (Fig. 2) from battery $7^a$, which, as before stated, becomes a local battery for these receiver circuits when the station is "receiving." Some of these local circuits are shown in the present case and will be briefly described. Continuing the description with especial reference to the receiver of Fig. 2, because the station of that figure is shown as "receiving," one of these local circuits is for energizing magnet $58^a$ providing the field for coils 41ª, 54ª, and consists of wire 21ª from the positive pole of battery 7ª, wire 59ª, a lock magnet 60ª (the functions of which will be hereinafter described), wires 61ª, 62ª, magnet 58ª, wires 63ª, 64ª, armature 56ª of relay 52ª, contact 57ª, and wires 65ª, 30ª to the negative pole of battery 7ª. A branch of this circuit, consisting of wire 66ª connected with wire 61ª, and wire 67ª connected with wire 64ª, passes through paper shifting magnet 68ª at the receiver, so that immediately on the closing of left main line circuit and consequent closing of the local circuits from battery 7ª by the armature 56ª, said paper shifting magnet is energized and the paper at the receiver, therefore, shifted. Another branch of this local circuit, consisting of wires 69ª, connected with wires 67ª, and wires 70ª, 71ª connected with a pen lifter magnet 72ª and field magnet 58ª, controls the raising and lowering of the receiving pen, this circuit being controlled by circuit closing means inclosed in a receptacle 73ª secured on a diaphragm 74ª mounted on relay 52ª, as in the aforesaid Tiffany application.

The parts thus far referred to are so fully described in the aforesaid application of George S. Tiffany, that they need not be further described here, as, of themselves, they constitute no part of the present invention.

Referring now to the other figures of the drawings, the master switch, the lock magnet therefor, and the paper shifting mechanism at the transmitter, will now be described.

The spring contact plates 8, 9, 10 are all secured to a swinging plate or yoke 75, from which they are suitably insulated and which is provided with ears 76 through which it is pivoted in lugs 77 rising from the base of the transmitter frame below the writing platen 78; yoke 75 being thus adapted to swing vertically so as to bring its contact plates into engagement with the lower set of contacts 11, 12, etc., or the upper set of contacts 17, 18, etc. The plate 75 has a forward extension 79, which is, in turn, provided with a downward projection 80 with which is connected one end of a coil spring 81, the opposite end of which is connected with the free end of a flat spring 82 secured to a block 83 on the base of the transmitter frame. The projection 80, spring 81 and spring 82 are so disposed relatively to each other, and to the pivots of yoke 75, that, when flat spring 82 is in its normal or upper position (Fig. 6), it will be above the pivots of yoke 75, so that it and spring 81 will hold yoke 75 with its contact plates 8, 9, 10 in their uppermost positions; while when the free end of spring 82 is depressed, it will take up a position below the pivots of yoke 75 and, therefore, through spring 81, rock yoke 75 and its contact plates 8, 9, 10 down to their lowermost positions. Upward movement of the yoke 75 is limited by a tail piece 84 integral with yoke 75 and engaging the base of the machine in rear of the yoke's pivots. It will be obvious that as the free end of flat spring 82 is moved upward or downward, the yoke 75 and its contact plates 8, 9, 10 will, as soon as the free end of spring 82 passes above or below the yoke's pivot, be moved abruptly to its uppermost or lowermost position, respectively; the master switch of the present invention being thus of the "snap switch" type.

The means for manually operating the master switch consists of a plug 85, the upper end of which projects upwardly through an opening provided in a table 86 flush with platen 78 and in a plate 87 beneath said table, the lower end of this plug 85 being secured to the free end of flat spring 82. Plug 85 is retained in its uppermost position by flat spring 82 (see Fig. 6), and in its lowermost position by plate 87, which is designed to engage a notch 88 in the side of the plug (see Fig. 9). The upper end of plug 85 is hollowed out slightly, so that the operator, when he desires to shift the switch down, may by engaging the point of the tracer 1 with the upper end of plug 85 move it down and then rock it forward slightly so that plate 87 will engage notch 88 and thus lock the plug, and, therefore, the switch, in their lowermost positions; while when he wishes to shift the switch upwardly he may do so by engaging the point of the tracer with the upper end of the plug and then rocking the latter so as to disengage its notch 88 from plate 87, when flat spring 82 will move plug 85 and the switch upwardly. The operation of this switch, therefore, is or may be performed by the operator with the hand he uses in writing instead of, as in prior switches, by the other hand. The movement of the switch and contact plates 8, 9, 10 upward, as before explained, connects the receiver of the station with a distant transmitter, this being the normal position of the switch in each station when the station is not in use; while the movement of the switch downward connects the transmitter of a station with a distant receiver. To prevent movement of the switch of a station from receiving position while a distant station is transmitting messages to it, lock magnet 60, before referred to, is provided. This magnet is located beneath the base of the transmitter and is provided with an armature 89 projecting upwardly through an opening in said base so that its upper end may be swung under flat spring 82 and thus prevent depression of said spring and downward movement of the master switch and its contact plates 8, 9, 10 from their "receiving" position (Fig. 2). Normally, the armature 89 occupies the position in which it is shown in Figs. 1 and 8. As soon, however, as current is on left main line from a distant transmitter, magnet 60 is energized and its armature 89 is rocked to the locking position relatively to flat spring 82 in which armature 89ª is shown in Fig. 2, and armature 89 is shown by dotted lines in Fig. 8, and it remains in this locking position until current ceases on left main line, when it resumes the position shown in Figs. 1 and by full lines in Fig. 8. Movement of the master switch is, therefore, prevented until the operator of the distant transmitter has shifted the master switch of the latter from "transmitting" to "receiving" or normal position, when the right and left line circuits of the receiver are, of course, opened. Energization of the lock magnet is effected by the closing of the local receiver circuit or circuits from battery 7 or 7ª, as the case may be. Taking for convenience, battery 7ª of Fig. 2 because that station is shown as "receiving," the circuit for so energizing the lock magnet 60ª consists of wires 21ª, 59ª, from positive pole of battery 7ª, magnet 60ª, wires 61ª, 62ª, field magnet 58ª, wire 63ª, 64ª, armature 56ª, contact 57ª, and wires 65ª, 30ª, to the negative pole of battery. This circuit is controlled by relay 52ª, which, as the left main line is closed (when the transmitter of Fig. 1 is connected with the receiver of Fig. 2), attracts its armature 56ª and engages it with contact 57ª, thus closing the circuit, and which as the left main line is opened (when the transmitter of Fig. 1 is disconnected from the receiver of Fig. 2) releases its armature 56ª and thus opens this circuit; armature 89ª then moving from the locking position shown in Fig. 2 to the position in which armature 89 is shown in Fig. 1.

The paper shifting mechanism at the transmitter consists (Figs. 1, 10 and 11) of a magnet 90 mounted in brackets 91 secured to the transmitter base, a swinging armature 92 pivotally mounted by arms 93 in brackets 91, and a bar 94 pivotally mounted by arms 95 in arms 93 so as to move with and also swing relatively to the armature 92. The paper strip 96 at the transmitter is led from writing platen 78, between armature 92 and bar 94, which normally (i. e., while the station is set for "receiving" with the master switch in the position shown in Fig. 2) occupy the position in which they are shown in Fig. 10, in which position the magnet 90 is of course deënergized. When magnet 90 is energized, it attracts its armature 92 and the latter and bar 94 are moved to the position shown in Fig. 11, and, in so moving, grip the paper strip 96 between them and feed it forward or away from writing platen 78. Magnet 90 is thus energized to shift the paper, from battery 7, in the following manner. When the master switch is moved downwardly to the position shown in Fig. 1 or to "transmitting" position, and contact plate 10, as before described, thus closes the circuit 21, 22, 15, 10, 16, 23, 24, etc., to rheostats, a branch circuit is closed through magnet 90, consisting of wire 97, connected with wire 23 and wire 98 connected with wire 28 of the rheostat circuit just referred to, and said magnet 90, therefore, energized. The armature 92 and bar 94 then move and shift the strip 96, as shown in Fig. 11, and remain in this position until the master switch is swung upwardly by the operator, when, this circuit being broken by the disengagement of contact plate 10 from contacts 15, 16, magnet 90 is deënergized and releases its armature 92, which, with bar 94, then assumes the position in which it is shown in Fig. 10. It will be obvious that by repeated operations of the master switch, the operator may shift the paper strip 96 to any extent desired, and it will also be obvious that such shifting of the paper is or may be done by him with the same hand used in writing by the engagement of the tracer point with plug 85. It will also be understood that as the paper is thus shifted at the transmitter, the paper at the receiver of the distant station will also be shifted by the closing of the left main line circuit to the receiver and the closing, by armature 56ª, of the local circuit through paper shifting magnet 68ª.

What I claim is:—

1. The combination with the transmitter and receiver of a telautographic station and circuit connections leading from them to the receiver and transmitter, respectively, of a distant station, of a snap-switch, in one position of which the receiver is "on" and the transmitter "off" with respect to the distant station, and in another position of which this condition is reversed, manually controlled spring mechanism for moving the switch with a snap action to these two positions, and a lock operated simultaneously with the switch for retaining it in the latter position, substantially as described.

2. The combination with the transmitter and receiver of a telautographic station and circuit connections leading from them to the receiver and transmitter, respectively, of a distant station, of a pivotally supported snap-switch, in one position of which the receiver is "on" and the transmitter "off" with relation to the distant station, and in another position of which this condition is reversed, a suitably supported spring connected with the switch and movable to opposite sides of its pivotal support so as to move it to these positions, and manually operated means for so moving said spring, substantially as described.

3. The combination with the transmitter and receiver of a telautographic station and circuit connections leading from them to the receiver and transmitter, respectively, of a distant station, of a pivotally supported snap-switch, in one position of which the receiver is "on" and the transmitter "off" with relation to the distant station, and in another position of which this condition is reversed, a suitably supported actuating spring connected with the switch and movable to opposite sides of its pivotal support so as to move it to these positions, manually operated means for so moving said spring, and a lock operated simultaneously with the switch for retaining it in its second above-named position, substantially as described.

4. The combination with the transmitter and receiver of a telautographic station and circuit connections leading from them to the receiver and transmitter, respectively, of a distant station, of a pivotally supported snap-switch, in one position of which the receiver is "on" and the transmitter "off" with relation to the distant station, and in another position of which this condition is reversed, an actuating spring connected with the switch and movable to opposite sides of its pivotal support so as to move it to these positions, a spring support connected with said actuating spring, and a manually operated plug connected with said spring support and adapted to move it from normal position so as to effect such movement of the actuating spring, substantially as described.

5. The combination with the transmitter and receiver of a telautographic station and circuit connections leading from them to the receiver and transmitter, respectively, of a distant station, of a pivotally supported snap-switch, in one position of which the receiver is "on" and the transmitter "off" with relation to the distant station, and in another position of which this condition is reversed, an actuating spring connected with the switch and movable to opposite sides of its pivotal support so as to move it to these positions, a spring support connected with said actuating spring, a manually operated plug connected with said spring support and adapted to move it from normal position so as to effect such movement of the actuating spring, and a lock operated simultaneously with the switch for retaining it in its second above-named position, substantially as described.

6. The combination with the transmitter and receiver of a telautographic station and circuit connections leading from them to the receiver and transmitter, respectively, of a distant station, of a manually controlled spring-actuated snap-switch, in one position of which the receiver is "on" and the transmitter "off" with respect to the distant station, and in another position of which this condition is reversed, and a lock magnet electrically controlled from the transmitter of the distant station and provided with means for preventing movement of said switch from its first-named position while current is on line to the station from the distant transmitter, substantially as described.

7. The combination with the transmitter and receiver of a telautographic station and circuit connections leading from them to the receiver and transmitter, respectively, of a distant station, of a manually controlled spring-actuated snap-switch, in one position of which the receiver is "on" and the transmitter "off" with respect to the distant station, and in another position of which this condition is reversed, a lock magnet electrically controlled from the transmitter of the distant station and provided with means for preventing movement of said switch from its first-named position while current is on line to the station from the distant transmitter, and a lock operated simultaneously with the switch for retaining it in its second-named position, substantially as described.

8. The combination with the transmitter and receiver of a telautographic station and circuit connections leading from them to the receiver and transmitter, respectively, of a distant station, of a pivotally supported snap-switch, in one position of which the receiver is "on" and the transmitter "off" with relation to the distant station, and in another position of which this condition is reversed, a suitably supported actuating spring connected with the switch and movable to opposite sides of its pivotal support so as to move it to these positions, manually operated means for so moving said spring, and a lock magnet electrically controlled from the transmitter of the distant station and provided with means for preventing movement of said switch from its first-named position while current is on line to the station from the distant transmitter, substantially as described.

9. The combination with the transmitter and receiver of a telautographic station and circuit connections leading from them to the receiver and transmitter, respectively, of a distant station, of a pivotally supported snap-switch, in one position of which the receiver is "on" and the transmitter "off" with relation to the distant station, and in another position of which this condition is reversed, a suitably supported actuating spring connected with the switch and movable to opposite sides of its pivotal support so as to move it to these positions, manually operated means for so moving said spring, a lock magnet electrically controlled from the transmitter of the distant station and provided with means for preventing movement of said switch from its first-named position while current is on line to the station from the distant transmitter, and a lock operated simultaneously with the switch for retaining it in its second-named position, substantially as described.

In testimony whereof, I have hereunto set my hand; in the presence of two subscribing witnesses.

RALPH W. ARMSTRONG.

Witnesses:
J. A. GRAVES,
PHILIP N. TILDEN.